UNITED STATES PATENT OFFICE.

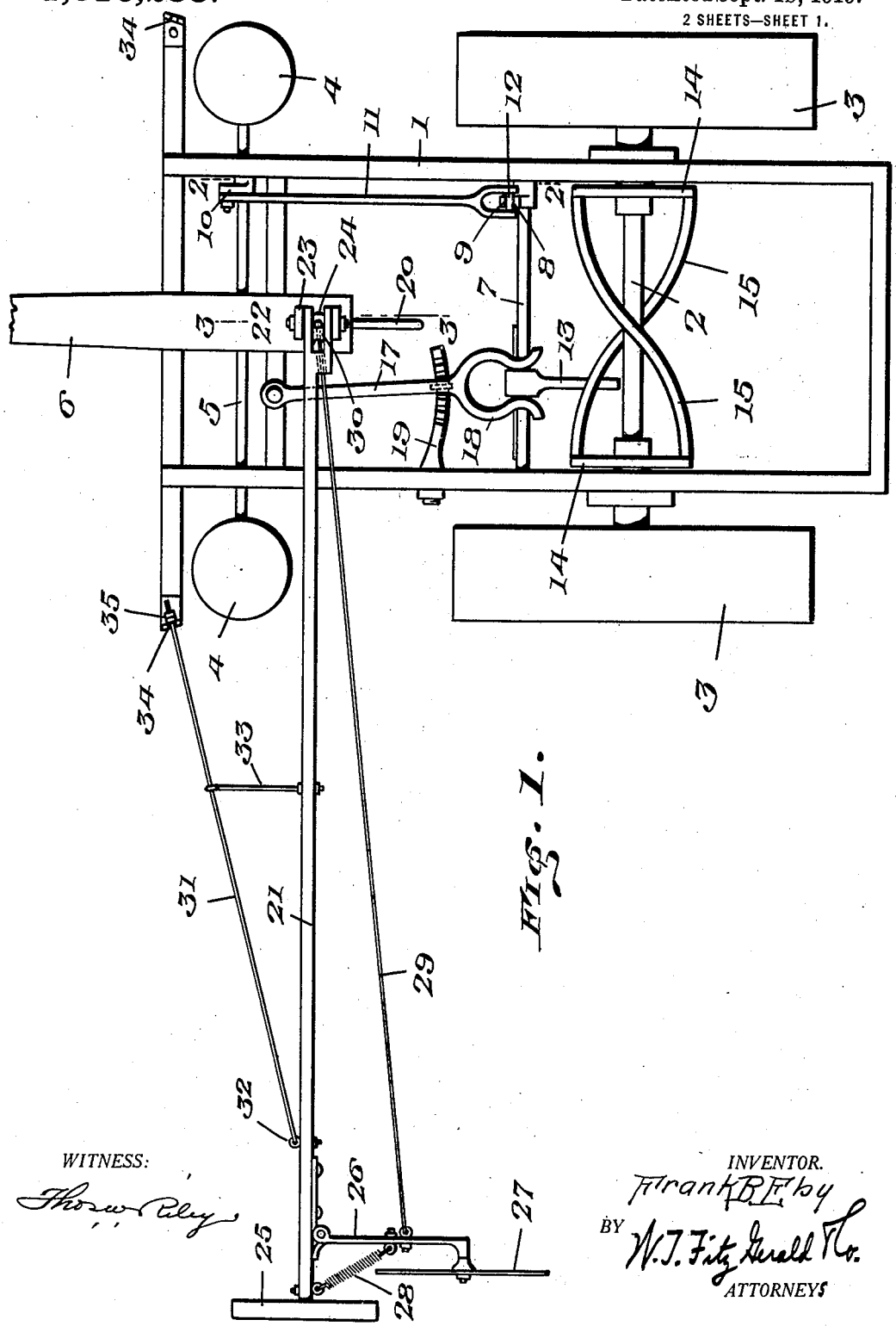

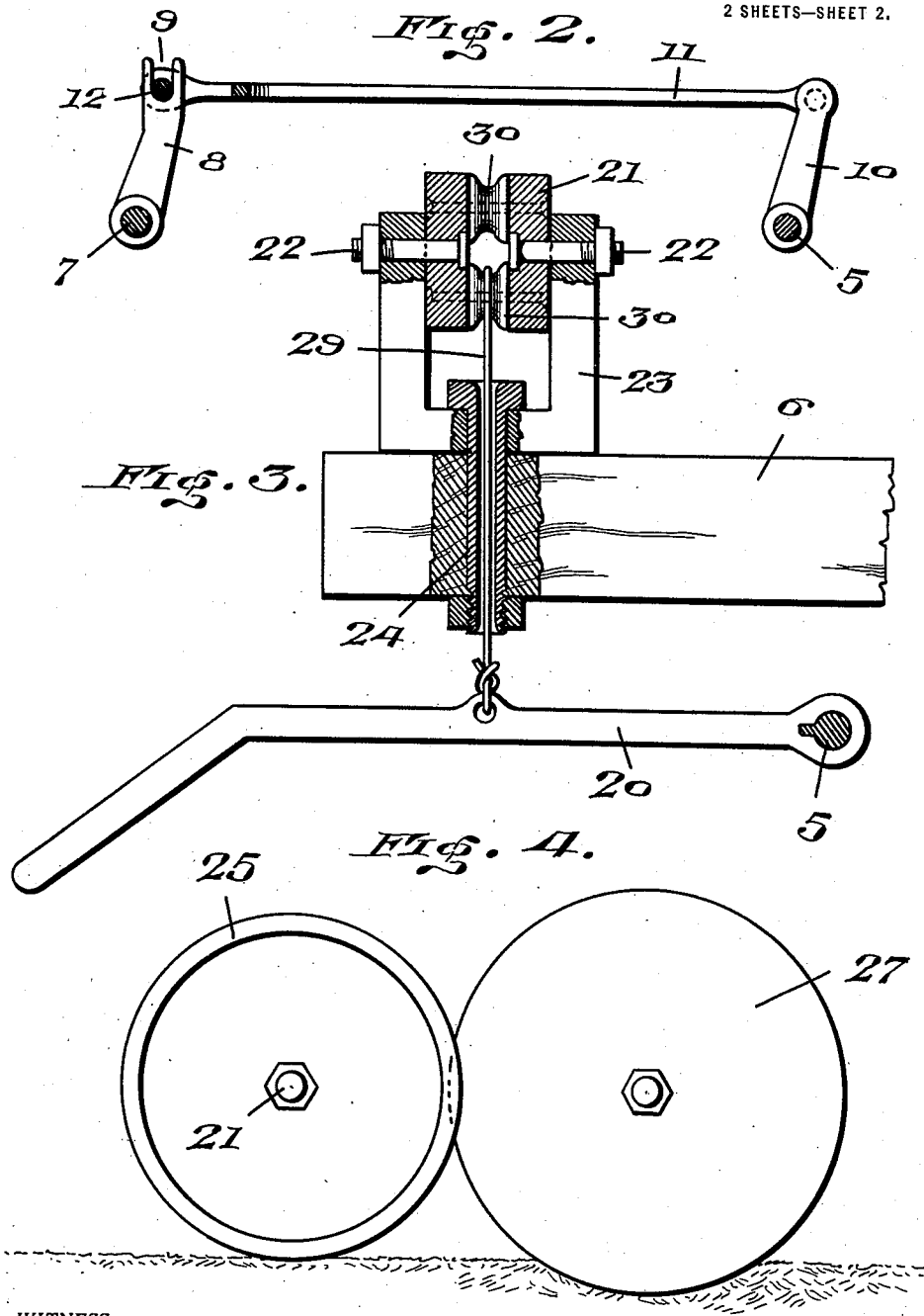

FRANK B. EBY, OF BRISTOL, INDIANA.

CORN-PLANTER.

1,316,288.  Specification of Letters Patent.  Patented Sept. 16, 1919.

Application filed March 14, 1919. Serial No. 282,760.

*To all whom it may concern:*

Be it known that I, FRANK B. EBY, a citizen of the United States, residing at Bristol, in the county of Elkhart and State of Indiana, have invented certain new and useful Improvements in Corn-Planters; and I do hereby declare the following to be a full, clear, and exact description of the invention, such as will enable others skilled in the art to which it appertains to make and use the same.

The present invention relates to corn or seed planters, and aims to provide a novel and improved wireless check row planter.

One of the objects of the invention is the provision of novel and efficient means for operating the seed droppers from the wheels of the machine, so that the seed is dropped at predetermined intervals, and permitting the dropping of the seed to the advanced or retarded at the will of the operator in order to check with the rows previously planted, in going back and forth over the field, such adjustment of the mechanism being accomplished without interfering with the operation.

Another object is the provision of a novel and improved marking device to make marks in the ground at one side of the machine at the points where seed is dropped, in order that the machine in coming back can be controlled to drop the seed at the desired points, such marking device being of unique construction to provide a distinct or peculiar mark in the ground which will not escape observation.

It is also the object of the invention to provide such a mechanism which is comparatively simple in construction, which can be readily applied to planters now in use, and which will provide for the efficient operation and control of the planter.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a plan view of a planter embodying the present improvements.

Figs. 2 and 3 are enlarged sectional details taken on the respective lines 2—2 and 3—3 of Fig. 1.

Fig. 4 is a side elevation of the marking disk and its supporting wheel.

The planter is illustrated as of conventional construction, having the frame 1 mounted on a rotating axle 2 on which the ground wheels 3 are secured. Seed droppers 4, of which there may be any suitable kind, are carried by the frame 1 and are operated by a transverse rock shaft 5 to drop the seed at intervals. The frame 1 has secured on its forward end a tongue 6 for hitching the draft animals to the planter.

The operating mechanism for the seed droppers includes a transverse rock shaft 7 mounted in the frame 1, preferably in front of the axle 2, and having secured thereon near one end an upwardly projecting arm 8 having a slot or seat 9 in its upper end. An arm 10 secured to the shaft 5 extends upwardly therefrom and has connected thereto the front end of a link 11, the rear end of which is bifurcated and provided with a cross pin 12 adapted to be dropped into the slot 9, so as to connect the shaft 5 and 7, it being noted at this point, that the seed droppers can be readily disconnected from the actuating means by lifting the link 11 from the arm 11. The rock shaft 7 is actuated from the axle 2 which rotates with the wheels 3 as the planter is pulled over the ground, and for this purpose an arm 13 is feathered or mounted slidably on the shaft 7 for adjustment longitudinally of the axle 2, and said axle carries a drum for oscillating the arm 13. This drum includes the end plates 14 and a pair of helical bars 15 having their ends secured to the plates 14. As shown, there are two of the bars 15, although there may be different numbers according to the construction of the machine. These bars 15 contact with the arm 13 as the axle rotates thus pushing the arm 13 downwardly and then releasing it so that the arm is oscillated intermittently at the proper intervals. When the arm 13 is moved downwardly by one of the bars 15, this will pull the link 11 rearwardly to operate the droppers 4, and the parts are returned to the initial position after the bar 15 has passed the arm 13. By the provision of the bars 15 of helical form, in connection with the adjustment of the arm 13, this enables the dropping of the seed to be advanced or retarded, so as to check with the rows or hills previously planted. Thus, by moving the arm 13 toward one side, the bars 15 will swing the arm 13 sooner than before, whereas when the arm 13 is adjusted toward the other side, said arm will be operated later. In this manner, by sliding the arm 13 along the shaft 7, the operation, of the seed droppers will be advanced or retarded at the will of the operator, in order that the seed will be dropped in line with the hills previously planted. This is especially necessary when turning around at the ends of the rows and starting new rows, so that the hills being planted will check with those already planted, as will be understood, by those versed in the art.

As a means for shifting the arm 13, a lever 17 is provided, said lever being fulcrumed on the frame, and having a fork 18 or other means to engage the arm 13, whereby the lever when swung will slide the arm 13. A rack 19 is carried by the frame 1 for the engagement with the lever 17 to hold it in any adjusted position, and therefore retain the arm 13 in place. The lever 17 can be readily lifted from the teeth or notches of the rack 19 to be swung for setting the arm 13.

A rearwardly extending marking arm 30 is secured to the shaft 5 under the tongue 6, so that when the shaft 5 is turned for dropping the seed, the arm 20 is swung downwardly to bring its rear end into engagement with the ground for making a mark, to facilitate the adjustment of the seed dropping mechanism. This marker is used for setting the seed dropping mechanism. The machine is moved over the marks previously made by the mechanism which will be described presently, and the marks made by the arm 20 should coincide or register with the marks previously made, and if the marks made by the arm 20 do not coincide, but are either in front or in rear of the marks previously made, then the arm 13 is set in one direction or the other until registration of the marks are obtained. In this manner, the operator in watching the marks made by the arm 20 in comparison with the marks previously made, can readily adjust the seed dropping mechanism so that it will check with the hills previously planted.

The marking device for making marks in the ground at the unplanted side of the machine to be used as a guide in connection with the arm 20 as just described, includes a spar or bar 21 extending transversely to one side of the machine and having its inner end bifurcated and pivoted as at 22, within a U-shaped standard 23 secured on the tongue 6 near the rear end thereof by means of a tubular bolt 24 above the marking arm 20. A ground wheel 25 is journaled on the outer end of the bar 21 to ride on the ground and support the outer end of said bar, it being noted that the bar 21 can swing upwardly and downwardly due to irregularities in the surface of the ground. A rearwardly extending arm 26 is hinged to the bar 21 near the wheel 25 and carries a marking disk or member 27 parallel with the wheel 25 and located at the inner side and slightly in rear thereof. The wheel 25 supports the marking disk 27 which has its lower portion working in the ground, as seen in Fig. 4. A spring 28 connects the bar 21 and arm 26 to swing the arm 26 outwardly into longitudinal position, and a cord or flexible element 29 is connected to the arm 26 to swing same inwardly and thus pull the disk 27 to an oblique position, which will make a distinctive mark on the ground that cannot be mistaken by the operator. The cord 29 extends within the slot in the inner end of the bar 21 between a pair of pulleys 30 mounted in said slot one above the other, and the cord 29 extends downwardly over the lowermost pulley and through the tubular bolt or member 24, with the inner end of the cord attached to the arm 20, as seen in Fig. 3. Therefore, as the arm 20 is swung downwardly due to the operation of the seed droppers, the cord 29 is pulled to swing the arm 26 and disk 27 inwardly, thereby making the check mark at the time the seed is dropped. When the arm 20 is raised, the cord 29 is slackened, and the spring 28 will pull the arm 26 and disk 27 back to normal position. The disk 27 continually engages the ground, but when in normal longitudinal position, simply makes a slit in the ground, whereas when the seed is dropped and the disk 27 swung inwardly to an oblique position, it will push the ground to one side in a peculiar way, to make the distinctive mark in the ground. These marks are made at the same intervals that the seed is dropped, and the machine in being moved across the field again passes over these marks so that the operation of the arm 20 as above described, enables the operator to set the seed dropping mechanism to operate at the proper time.

The marking mechanism in being pivotally connected to the standard 23 can be swung from one side of the machine to the other as the machine moves in opposite direction, so that the marker will be at the unplanted side of the machine in going over the field, it being noted that when the bar 21 is swung over from one side to the other, the cord 29 will drop from one pulley onto the other.

In order to resist the tendency of the bar 21 to swing rearwardly or break off, an oblique tie rod 31 is provided, the same having its outer end connected as at 32, with the bar 21 near its outer end, and said rod 31 extends through a forwardly extending brace 33 carried by the bar 21. The inner end of the rod 31 engages a slotted member 34 secured on the frame 1 and has nuts 35 which can be tightened to bear against the member 34 so that the tie rod 31 will prevent the bar 1 from bending rearwardly, thus taking up the strains. One of the slotted members 34 is secured on the frame 1 at each side of the machine, so that the rod 31 can be connected to the frame in either position of the marking device.

Having thus described the invention, what is claimed as new is:—

1. A planter embodying in combination with seed droppers and ground wheels, a drum operated by the ground wheels and having a bar of helical form, and an arm for operating the seed droppers and mounted for adjustment longitudinally of the drum to be operated by said bar.

2. A planter embodying in combination with seed droppers and an axle having ground wheels, a drum mounted on the axle and having a bar of helical form, a rock shaft parallel with the axle and operatively connected with the seed droppers, an arm slidable on said rock shaft to be operated by said bar, and means for adjusting said arm on said shaft and holding it in adjusted position.

3. A planter embodying in combination with a wheel mounted frame and a seed dropping mechanism, including a rock shaft; a marking arm secured to said shaft to swing downwardly and mark the ground under the frame, supporting means extending to one side from said frame, a marking member carried by said supporting means to mark the ground at the unplanted side of the planter, and an operative connection between said arm and marking member to operate the latter when said arm is swung downwardly.

4. A planter embodying in combination with a wheel mounted frame and a seed dropping mechanism, a bar connected to the frame and extending to one side, a marking member carried by said bar near the outer end thereof, a marking arm operated by said mechanism to swing downwardly under the frame to coöperate with marks previously made by said marking member, and a cord connecting said marking member and arm whereby the downward movement of the arm operates said member.

5. A planter embodying in combination with a wheel mounted frame and a seed dropping mechanism, of a transverse bar having its inner end pivoted on the frame to swing from one side to the other, a marking member carried by said bar near the outer end thereof, a marking arm operated by said mechanism below the inner end of said bar, a pair of vertically spaced pulleys carried by said bar at the inner end thereof, and a cord connecting said marking member and arm and extending between said pulleys.

6. A planter embodying in combination with a wheel mounted frame and a seed dropping mechanism, a transverse bar having its inner end pivoted on the frame to swing from one side to the other, a ground wheel journaled on the outer end of said bar to roll on the ground, a marking member carried by said bar near the outer end thereof, and means for operating said marking member when said mechanism is operated.

7. A planter having a marking device, including a marking member to roll in the ground and mounted to swing sidewise to an oblique position, and means for intermittently swinging said member to make marks on the ground.

8. A planter having a marking device including a hinged arm, a marking disk carried thereby to roll in the ground, and means for intermittently swinging said arm to move the disk to an oblique position for making marks on the ground.

9. A planter embodying a marking device including a rearwardly extending hinged arm, a marking disk carried thereby to move on the ground, means for swinging said arm inwardly including a cord connected thereto, and a spring for returning said arm.

10. A planter including in combination a wheel mounted frame and a seed dropping mechanism, a transverse bar having its inner end pivoted on the frame, a supporting wheel journaled to the outer end of said bar, a marking member carried by said arm near the outer end to engage the ground and swing to an oblique position, and means operated by said mechanism for swinging said marking member.

11. A planter embodying in combination with a wheel mounted frame and a seed dropping mechanism, a transverse bar having its inner end pivoted on the frame, a supporting wheel journaled on the outer end of the bar to roll on the ground, an arm hinged to said bar near the outer end, a marking disk carried by said arm to engage the ground, means operated by said mechanism and including a cord connected to said arm for swinging it inwardly, and a spring for returning said arm.

In testimony whereof I have signed my name to this specification in the presence of two subscribing witnesses.

FRANK B. EBY.

Witnesses:
CORNELIUS C. DAILY,
MINOR E. TAVERNIER.

Copies of this patent may be obtained for five cents each, by addressing the "Commissioner of Patents, Washington, D. C."